(12) United States Patent
Kuo et al.

(10) Patent No.: US 8,587,857 B2
(45) Date of Patent: Nov. 19, 2013

(54) ELECTRO-WETTING DISPLAY DEVICE AND NON-POLAR COLOR SOLUTION THEREOF

(75) Inventors: Shu-Wei Kuo, Taipei County (TW); Chung-Wei Wang, Taipei County (TW); Wei-Yuan Cheng, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 40 days.

(21) Appl. No.: 12/975,301

(22) Filed: Dec. 21, 2010

(65) Prior Publication Data
US 2012/0105934 A1    May 3, 2012

(30) Foreign Application Priority Data
Oct. 27, 2010    (TW) .............................. 99136797 A

(51) Int. Cl.
*G02B 26/00* (2006.01)
*G02B 5/23* (2006.01)

(52) U.S. Cl.
USPC .......................................... 359/290; 252/586

(58) Field of Classification Search
USPC ......... 359/290–293, 295, 315–316, 276, 238, 359/245, 242, 259, 244, 253–254, 265, 359/665; 349/33; 534/573, 756; 106/31.77, 106/31.78, 31.79; 252/500, 582, 583, 586
See application file for complete search history.

(56) References Cited

U.S. PATENT DOCUMENTS

| | | | |
|---|---|---|---|
| 5,024,698 A | 6/1991 | Schwartz et al. | |
| 5,062,894 A | 11/1991 | Schwartz et al. | |
| 5,902,358 A | 5/1999 | Baxter et al. | |
| 5,922,118 A | 7/1999 | Johnson et al. | |
| 6,911,073 B2 | 6/2005 | Adams et al. | |
| 2002/0188053 A1 | 12/2002 | Zang et al. | |
| 2002/0196525 A1 | 12/2002 | Chen et al. | |
| 2008/0165411 A1 | 7/2008 | Wang et al. | |
| 2009/0168144 A1* | 7/2009 | Lo et al. | 359/290 |
| 2010/0220380 A1* | 9/2010 | Hayes et al. | 359/290 |
| 2010/0292450 A1* | 11/2010 | Shiga et al. | 534/756 |
| 2011/0226998 A1* | 9/2011 | Van De Weijer-Wagemans et al. | 252/500 |
| 2012/0092753 A1* | 4/2012 | Heikenfeld et al. | 359/296 |

FOREIGN PATENT DOCUMENTS

| | | |
|---|---|---|
| CN | 1942820 | 4/2007 |
| TW | 200933192 | 8/2009 |
| WO | 2008142086 | 11/2008 |
| WO | 2010031860 | 3/2010 |
| WO | 2010104606 | 9/2010 |

OTHER PUBLICATIONS

"First Office Action of China Counterpart Application", issued on Nov. 16, 2012, p. 1-p. 8.

* cited by examiner

*Primary Examiner* — Tuyen Tra
(74) *Attorney, Agent, or Firm* — Jianq Chyun IP Office

(57) ABSTRACT

An electro-wetting display device and a non-polar color solution thereof are provided. The electro-wetting device includes a first substrate, a second substrate, a polar solution layer and a non-polar color solution layer. The first substrate is opposite to the second substrate. The polar solution layer is disposed between the first substrate and the second substrate. The non-polar color solution layer is disposed between the first substrate and the polar solution layer and includes at least one non-polar solvent, at least one dye and at least one improvement agent. The improvement agent is dissolved in the non-polar solvent, and the improvement agent is not dissolved in the polar solution layer.

16 Claims, 1 Drawing Sheet

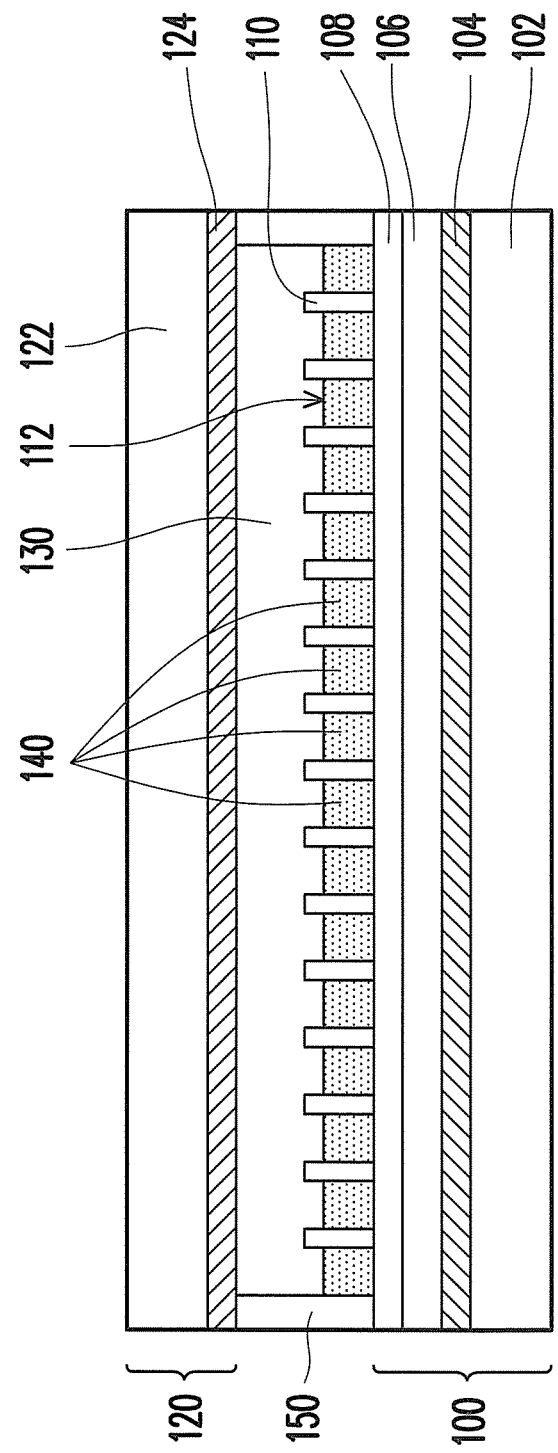

ELECTRO-WETTING DISPLAY DEVICE AND NON-POLAR COLOR SOLUTION THEREOF

CROSS-REFERENCE TO RELATED APPLICATION

This application claims the priority benefit of Taiwan application serial no. 99136797, filed on Oct. 27, 2010. The entirety of the above-mentioned patent application is hereby incorporated by reference herein and made a part of specification.

BACKGROUND

1. Field of the Disclosure

The disclosure relates to an electro-wetting display device and a non-polar color solution thereof.

2. Description of Related Art

In a display device that uses an electric field to control fluid, color filters or a color solution can be used to achieve an effect of colorization. However, the color filters may reduce a light flux, and reduce a bright and dark contrast of a display panel. The color solution is obtained by dissolving or dispersing color media (dyes or pigments) of different colors in a solution. Therefore, in order to achieve a better color performance of the display panel, a proportion of the color media in the solution is required to be increased, or a propagating length of light in the color solution is required to be increased.

In a current electro-wetting display device, the color media is generally disposed in a non-polar liquid layer. However, choices for non-polar soluble dyes in the market are relatively less, and in order to achieve a better absorption coefficient of the color media, the dye structure has to contain a specific function group, which may probably reduce solubility or the dye in the non-polar liquid and influence color performance of the device. In other words, a color saturation of the current electro-wetting display device is poor. If the propagating length of the light in the color solution is prolonged to improve the color performance, an ink thickness of the display device is required to be increased, which may probably influence driving performance of the display device.

SUMMARY OF THE DISCLOSURE

An exemplary embodiment of the disclosure provides an electro-wetting display device including a first substrate, a second substrate, a polar solution layer and a non-polar color solution layer. The first substrate is opposite to the second substrate. The polar solution layer is located between the first substrate and the second substrate. The non-polar color solution layer is located between the first substrate and the polar solution layer and includes at least one non-polar solvent, at least one dye and at least one improvement agent. The improvement agent is dissolved in the non-polar solvent, and the improvement agent is not dissolved in the polar solution layer.

Another exemplary embodiment of the disclosure provides a non-polar color solution including at least one non-polar solvent, at least one dye and at least one improvement agent. The improvement agent is dissolved in the non-polar solvent, and the improvement agent is not dissolved in a polar solution.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 is a cross-sectional view of an electro-wetting display device according to an exemplary embodiment of the disclosure.

DETAILED DESCRIPTION OF DISCLOSED EMBODIMENTS

FIG. 1 is a cross-sectional view of an electro-wetting display device according to an exemplary embodiment of the disclosure. Referring to FIG. 1, the electro-wetting display device includes a first substrate 100, a second substrate 120, a polar solution layer 130 and a non-polar color solution layer 140.

The first substrate 100 is opposite to the second substrate 120. In the present exemplary embodiment, the first substrate 100 includes a substrate 102, an electrode layer 104, a dielectric layer 106, a hydrophobic layer 108, and a hydrophilic wall structure 110.

The substrate 102 is mainly used to carry the display device. The substrate 102 can be a transparent substrate, and a material thereof is, for example, glass, quartz or organic polymers. The substrate 102 can also be a reflection substrate. Moreover, the substrate 102 can be a rigid substrate or a flexible substrate.

The electrode layer 104 is located at one side of the substrate 102. According to an exemplary embodiment, the electrode layer 104 includes a plurality of active devices and a plurality of pixel electrodes electrically connected to the active devices to form a pixel array layer. According to another exemplary embodiment, the electrode layer 104 can be a passive electrode pattern. Moreover, the electrode layer 104 may include a metal material with a high reflection property. If the electrode layer 104 uses a transparent conductive material, a reflection layer can be further disposed under the electrode layer 104.

The dielectric layer 106 is disposed on the electrode layer 104. A material of the dielectric layer 106 can be silicon oxide, silicon nitride or other dielectric materials.

The hydrophobic layer 108 is disposed on the dielectric layer 106. According to an exemplary embodiment, a method of forming the hydrophobic layer 108 is to perform a hydrophobic surface treatment to the surface of the dielectric layer 106, so as to change a property of the surface of the dielectric layer 106 to form the hydrophobic layer 108. According to another exemplary embodiment, a method of forming the hydrophobic layer 108 is to directly perform a coating process, a plating process or a deposition process on the dielectric layer 106 to form the hydrophobic layer 108.

The hydrophilic wall structure 110 is located on the hydrophobic layer 108 for defining a plurality of unit areas 112 on the first substrate 100. The unit area 112 corresponds to a display pixel unit. Therefore, if the electrode layer 104 of the first substrate 100 is a pixel array layer, the electrode layer 104 within each of the unit areas 112 includes at least one active device and at least one pixel electrode.

Moreover, the second substrate 120 includes a substrate 122 and an electrode layer 124. The second substrate 120 is also referred as an opposite substrate. The substrate 122 of the second substrate 120 can be a glass substrate, a quartz substrate or an organic polymer substrate. The substrate 122 can be a rigid substrate or a flexible substrate.

The electrode layer 124 is disposed at a side of the substrate 122. The electrode layer 124 is also referred to as an opposite electrode. Therefore, the electrode layer 124 and the electrode layer 104 are used for operating the liquid layer between the first substrate 100 and the second substrate 120 to achieve a display effect. Generally, the electrode layer 124 can be a transparent electrode layer, and a material thereof includes metal oxide, such as indium tin oxide or indium zinc oxide, etc.

Moreover, a sealant 150 is further disposed between the first substrate 100 and the second substrate 120 for adhering the first substrate 100 and the second substrate 120 to form a containing space between the first substrate 100 and the second substrate 120.

The polar solution layer 130 is located between the first substrate 100 and the second substrate 120. In detail, the polar solution layer 130 is located in the containing space between the first substrate 100 and the second substrate 120. The polar solution layer 130 can be water or other polar liquids.

The non-polar color solution layer 140 is filled in the unit areas 112 defined by the hydrophilic wall structure 110. In the present exemplary embodiment, the non-polar color solution layer 140 in the unit areas 112 includes color solutions of a plurality of colors, and each of the unit areas 112 is filled with the color solution of one color. For example, the non-polar color solution layer 140 includes the color solutions of black, red, green and blue, etc., and the unit areas 112 are respectively filled with the color solution of black, red, green or blue, etc.

Especially, the non-polar color solution layer 140 includes at least one non-polar solvent, at least one dye and at least one improvement agent. In the non-polar color solution layer 140 of the present exemplary embodiment, a proportion of the non-polar solvent is 20-90 wt %, a proportion of the dye is 1-40 wt % and a proportion of the improvement agent is 1-50 wt %.

In an exemplary embodiment, the non-polar solvent of the non-polar color solution layer 140 includes alkanes with a carbon number of 8-16, cyclic alkanes, aromatic series, or aliphatic series. Moreover, the non-polar solvent of the non-polar color solution layer 140 can be a single organic solvent, or a compound of multiple organic solvents. In the present exemplary embodiment, a polarity (chemical polarity) of the non-polar solvent of the non-polar color solution layer 140 is 0.1-2.

Moreover, the dye of the non-polar color solution layer 140 includes at least one solvent dye or at least one dispersed dye. Further, the dye may include at least one anthraquinone dye, at least one azo dye or at least one dispersed dye. For example, the anthraquinone dye can be a C.I. solvent dye, which may include C.I. solvent red 49, C.I. solvent blue 100, C.I. solvent blue 98, C.I. solvent blue 79, C.I. solvent black 29, C.I. solvent black 7, C.I. solvent orange 97 or C.I. solvent green 5. The azo dye can be a C.I. solvent dye, which may include C.I. solvent black 49, C.I. solvent red 164, C.I. solvent red 110, C.I. solvent yellow 4 or C.I. solvent yellow 126. The dispersed dye can be a Foron dye. Details of the aforementioned dyes may refer to WO/2010/104606, which is incorporated herein by reference. Moreover, the aforementioned dyes can be purchased from Sun Chemical Corp., Ciba or Evonik.

It should be noticed that color performance of the non-polar color solution layer 140 in each of the unit areas 112 is determined by the used dye. For example, if one of the unit areas 112 is filled with the non-polar color solution layer 140 of black, the dye of the non-polar color solution layer 140 filled in such unit area 112 can be C.I. solvent black 29, C.I. solvent black 7, C.I. solvent black 49 or a combination thereof. If one of the unit areas 112 is filled with the non-polar color solution layer 140 of red, the dye of the non-polar color solution layer 140 filled in such unit area 112 can be C.I. solvent red 49, C.I. solvent red 164, C.I. solvent red 110 or a combination thereof. Moreover, types and a number of the dyes in the non-polar color solution layer 140 in each of the unit areas 112 are not limited by the present exemplary embodiment. In other words, the dye of the non-polar color solution layer 140 in each of the unit areas 112 can be a single dye or a compound of multiple dyes. Moreover, the improvement agent of the non-polar color solution layer 140 can be dissolved in the non-polar solvent, and cannot be dissolved in the polar solution layer 130 located on top of the non-polar color solution layer 140. In the present exemplary embodiment, the improvement agent of the non-polar color solution layer 140 is selected from a group consisting of following chemical formulas (a formula 1 to a formula 5):

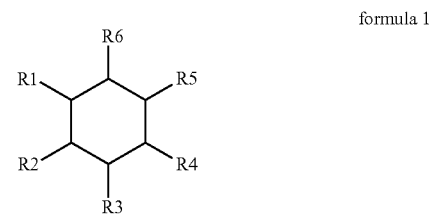

formula 1

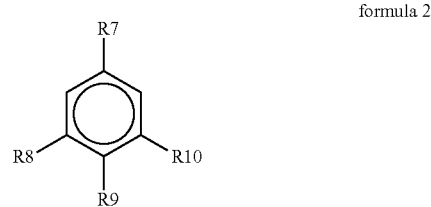

formula 2

formula 3

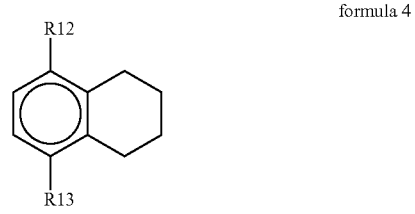

formula 4

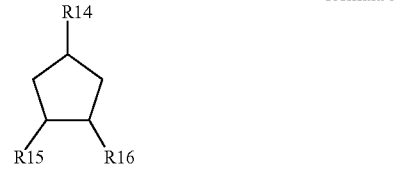

formula 5

Where, R1-R10 and R12-R16 respectively represent H, OH, alkyl with a carbon number of 1-3, cycloalkyl with a carbon number of 3-6, aromatic ring, heterocyclic group, alkyl ester or alkyl amine. Moreover, in the compound of the formula 3, R11 represents cycloalkyl with a carbon number of 3-6, aromatic ring or heterocyclic group.

In the present exemplary embodiment, in the above chemical formulas 1-5, the chemical structures can be symmetric by selecting the substituents, so that a polarity of the improvement agent can be less than 3.

Moreover, in the present exemplary embodiment, a viscosity of the improvement agent of the non-polar color solution layer 140 can be less than 3 cps, and a surface tension thereof can be less than 35 mN/m. In addition, the improvement agent of the non-polar color solution layer 140 is belonged to a non-ion improvement agent.

According to the above descriptions, the improvement agent of the non-polar color solution layer 140 has a function of improving solubility of the dye and the non-polar solvent.

For example, when a red dye (for example, the C.I. solvent red 164) is dissolved in a dodecane non-polar solvent, a solubility thereof is about 4 wt %. However, when the above red dye is dissolved in the dodecane non-polar solvent added with trimethylbenzene (TMB) improvement agent, the solubility thereof is increased to 10.5 wt %.

For another example, when a blue dye (for example, the C.I. solvent blue 98) is dissolved in the dodecane non-polar solvent, a solubility thereof is about 8 wt %. However, when the above blue dye is dissolved in the dodecane non-polar solvent added with the trimethylbenzene (TMB) improvement agent, the solubility thereof is increased to 21.5 wt %.

In the present exemplary embodiment, since the non-polar color solution layer 140 contains the improvement agent, solubility of the dye in the non-polar solvent can be increased. Therefore, the dye in the non-polar color solution layer 140 is unnecessary to be a dye with a specific function group for increasing an absorption coefficient of the color solution, so that usage of the improvement agent in the non-polar color solution layer 140 may increase selectivity of the dyes.

Moreover, in the present exemplary embodiment, since the non-polar color solution layer 140 contains the improvement agent, solubility of the dye in the non-polar solvent can be increased. Since the solubility of the dye in the non-polar solvent can be greatly increased, a color saturation of the electro-wetting display device can be improved, so as to improve the color performance of the electro-wetting display device.

Moreover, in the present exemplary embodiment, since the improvement agent is added in the non-polar color solution layer to improve the color saturation of the electro-wetting display device, the color performance of the electro-wetting display device can be improved without changing an internal composition structure of the electro-wetting display device.

In a conventional electro-wetting display device, the color performance thereof can be improved by increasing a propagating length of light in the color solution layer, though according to such method, a thickness of the color solution layer has to be increased, which may influence driving performance of the display device (for example, the power required for driving is increased, etc.). In the exemplary embodiment of the disclosure, the color saturation of the electro-wetting display device can be improved by adding the improvement agent into the non-polar color solution layer. Therefore, it is unnecessary to increase the propagating length of light in the color solution layer of the electro-wetting display device, so that the electro-wetting display device may have better driving performance.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electro-wetting display device, comprising:
a first substrate;
a second substrate, opposite to the first substrate;
a polar solution layer, located between the first substrate and the second substrate; and
a non-polar color solution layer, located between the first substrate and the polar solution layer, wherein the non-polar color solution layer comprises:
at least one non-polar solvent;
at least one dye; and
at least one improvement agent, wherein the improvement agent is dissolved in the non-polar solvent, and the improvement agent is not dissolved in the polar solution layer, and the improvement agent is selected from a group consisting of following chemical formulas (a formula 1 to a formula 5):

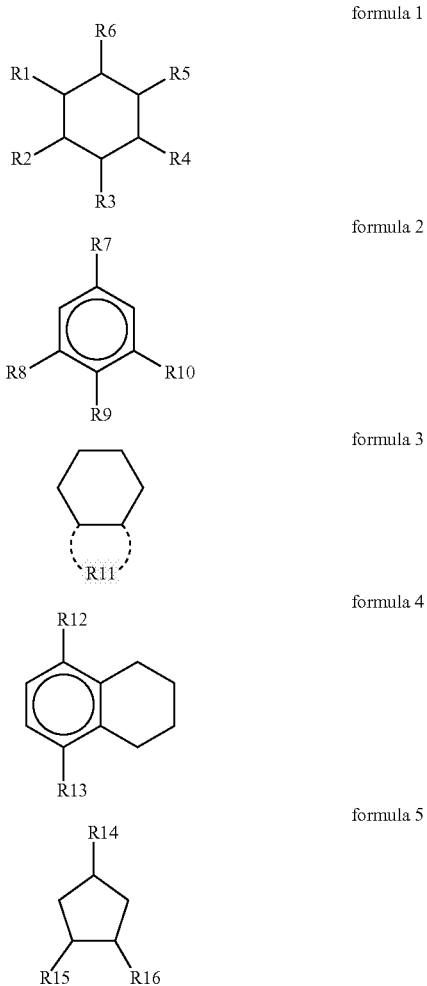

where R1-R10 and R12-R16 respectively represent H, OH, alkyl with a carbon number of 1-3, cycloalkyl with a carbon number of 3-6, aromatic ring, heterocyclic group, alkyl ester or alkyl amine, and R11 represents cycloalkyl with a carbon number of 3-6, aromatic ring or heterocyclic group.

2. The electro-wetting display device as claimed in claim 1, wherein in the non-polar color solution layer, a proportion of the non-polar solvent is 20-90 wt %, a proportion of the dye is 1-40 wt %, and a proportion of the improvement agent is 1-50 wt %.

3. The electro-wetting display device as claimed in claim 1, wherein a polarity of the non-polar solvent is 0.1-2.

4. The electro-wetting display device as claimed in claim 1, wherein a viscosity of the improvement agent is less than 3 cps, and a surface tension of the improvement agent is less than 35 mN/m.

5. The electro-wetting display device as claimed in claim 1, wherein the improvement agent is a non-ion improvement agent.

6. The electro-wetting display device as claimed in claim 1, wherein the non-polar solvent comprises alkanes with a carbon number of 8-16, cyclic alkanes, aromatic series, or aliphatic series.

7. The electro-wetting display device as claimed in claim 1, wherein the at least one dye comprises at least one solvent dye or at least one dispersed dye.

8. The electro-wetting display device as claimed in claim 1, wherein the at least one dye comprises at least one anthraquinone dye or at least one azo dye.

9. The electro-wetting display device as claimed in claim 8, wherein the at least one anthraquinone dye comprises C.I. solvent red 49, C.I. solvent blue 100, C.I. solvent blue 98, C.I. solvent blue 79, C.I. solvent black 29, C.I. solvent black 7, C.I. solvent orange 97 or C.I. solvent green 5.

10. The electro-wetting display device as claimed in claim 8, wherein the azo dye comprises C.I. solvent black 49, C.I. solvent red 164, C.I. solvent red 110, C.I. solvent yellow 4 or C.I. solvent yellow 126.

11. The electro-wetting display device as claimed in claim 1, wherein the first substrate comprises:
a substrate;
an electrode layer, located on the substrate;
a dielectric layer, located on the electrode layer;
a hydrophobic layer, located on the dielectric layer; and
a hydrophilic wall structure, located on the hydrophobic layer, for defining a plurality of unit areas on the first substrate.

12. The electro-wetting display device as claimed in claim 11, wherein the non-polar color solution layer is filled in the unit areas defined by the hydrophilic wall structure.

13. The electro-wetting display device as claimed in claim 12, wherein the non-polar color solution layer in the unit areas comprises color solutions of a plurality of colors.

14. The electro-wetting display device as claimed in claim 1, wherein the second substrate comprises:
a substrate; and
an electrode layer, disposed on the substrate.

15. The electro-wetting display device as claimed in claim 1, wherein a polarity of the improvement agent is less than 3.

16. A non-polar color solution, comprising:
at least one non-polar solvent;
at least one dye; and
at least one improvement agent, wherein the improvement agent is dissolved in the non-polar solvent, and the improvement agent is not dissolved in a polar solution, and the improvement agent is selected from a group consisting of following chemical formulas (a formula 1 to a formula 5):

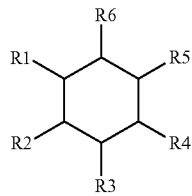

formula 1

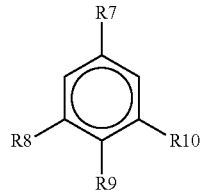

formula 2

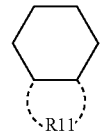

formula 3

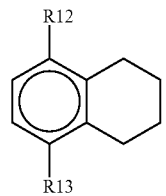

formula 4

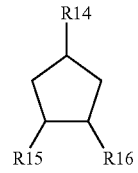

formula 5 where R1-R10 and R12-R16 respectively represent H, OH, alkyl with a carbon number of 1-3, cycloalkyl with a carbon number of 3-6, aromatic ring, heterocyclic group, alkyl ester or alkyl amine, and R11 represents cycloalkyl with a carbon number of 3-6, aromatic ring or heterocyclic group.

* * * * *